United States Patent
Tohta et al.

(10) Patent No.: US 7,291,092 B2
(45) Date of Patent: Nov. 6, 2007

(54) SHIFT CONTROL APPARATUS AND METHOD FOR AUTOMATIC TRANSMISSION

(75) Inventors: Yuzuru Tohta, Kanagawa (JP); Kenichiro Murakami, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 283 days.

(21) Appl. No.: 11/203,243

(22) Filed: Aug. 15, 2005

(65) Prior Publication Data

US 2006/0040790 A1 Feb. 23, 2006

(30) Foreign Application Priority Data

Aug. 18, 2004 (JP) .............................. 2004-238761

(51) Int. Cl.
*F16H 59/00* (2006.01)
(52) U.S. Cl. .............................. 477/98; 477/83; 477/84; 477/97; 477/116; 477/143; 477/148; 477/154; 74/331
(58) Field of Classification Search ...................... None
See application file for complete search history.

(56) References Cited

U.S. PATENT DOCUMENTS 5,411,451 A * 5/1995 Ando et al. .................. 477/144
5,697,864 A * 12/1997 Watanabe ..................... 477/98
5,839,989 A 11/1998 Saito et al.
5,938,563 A 8/1999 Nishio et al.
6,085,140 A * 7/2000 Choi ............................ 701/55
6,454,678 B1 * 9/2002 Lee ............................. 477/141
2004/0092365 A1 * 5/2004 Kwon et al. ................. 477/143

FOREIGN PATENT DOCUMENTS

JP 9-295528 A 11/1997

* cited by examiner

*Primary Examiner*—David D. Le
(74) *Attorney, Agent, or Firm*—Foley & Lardner LLP

(57) ABSTRACT

In shift control apparatus and method for an automatic transmission in which an engine speed is inputted, and a shift change in a shift stage of the automatic transmission is performed to make a gear shift, a shift revolution synchronization control in synchronization with the engine speed is performed and, in a case where the gear shift is made under a driving state in which there is a possibility of an occurrence of a shift shock, an engagement section which performs a power transmission under a presently selected shift stage is gradually released and another engagement section which enables a power transmission through the next selection scheduled shift stage is gradually engaged without an execution of the shift revolution synchronization control.

15 Claims, 13 Drawing Sheets

FIG.3A ACCELERATOR OPENING ANGLE (APO)

FIG.3B 3-rd SPEED SHIFT COMMAND / 2-nd SPEED

FIG.3C SYNCHRONIZATION REVOLUTION SPEED / INPUT REVOLUTION SPEED Nt / ENGINE SPEED Ne

FIG.3D RELEASE SIDE HYDRAULIC / ENGAGEMENT SIDE HYDRAULIC

FIG.3E DEMAND TORQUE / ENGINE TORQUE

FIG.3F LONGITUDINAL ACCELERATION

Td t1 t2 t6 t7 t8

FIG.4A ACCELERATOR OPENING ANGLE (APO)

FIG.4B 3-rd SPEED SHIFT COMMAND / 2-nd SPEED

FIG.4C SYNCHRONIZATION REVOLUTION SPEED / INPUT REVOLUTION SPEED Nt / ENGINE SPEED Ne

FIG.4D RELEASE SIDE HYDRAULIC / ENGAGEMENT SIDE HYDRAULIC

FIG.4E DEMAND TORQUE / ENGINE TORQUE

FIG.4F LONGITUDINAL ACCELERATION t1 t9    t10    t7    t8

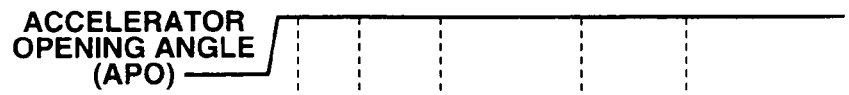
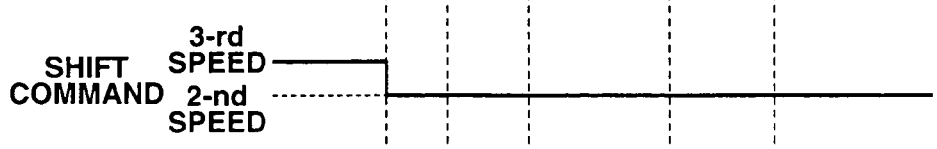
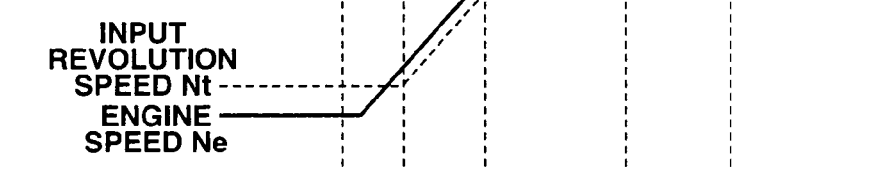
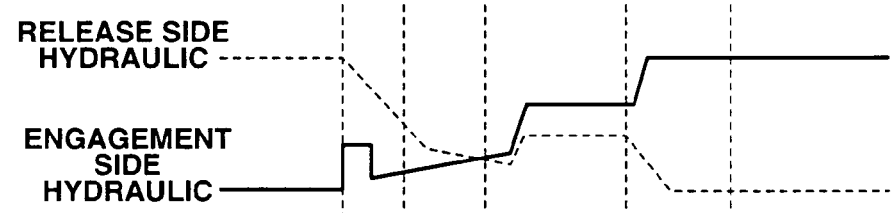
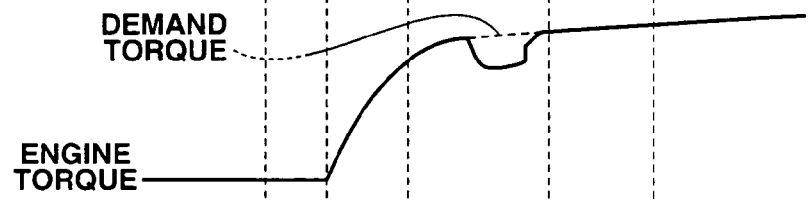
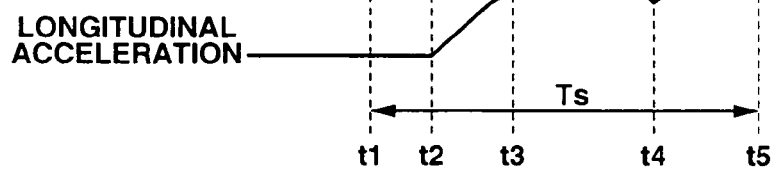

FIG.12A ACCELERATOR OPENING ANGLE (APO)
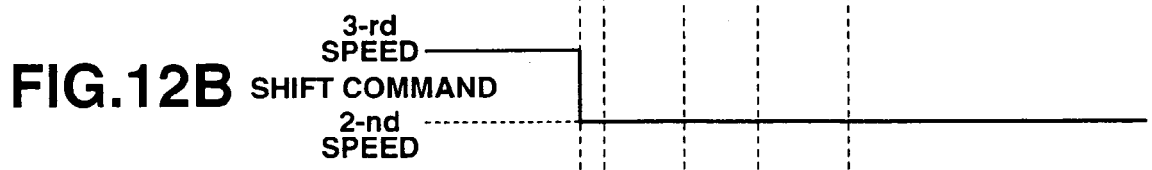
FIG.12B SHIFT COMMAND — 3-rd SPEED / 2-nd SPEED
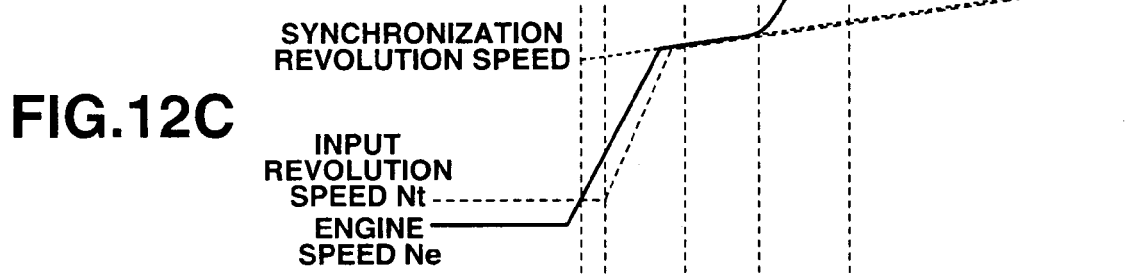
FIG.12C SYNCHRONIZATION REVOLUTION SPEED / INPUT REVOLUTION SPEED Nt / ENGINE SPEED Ne
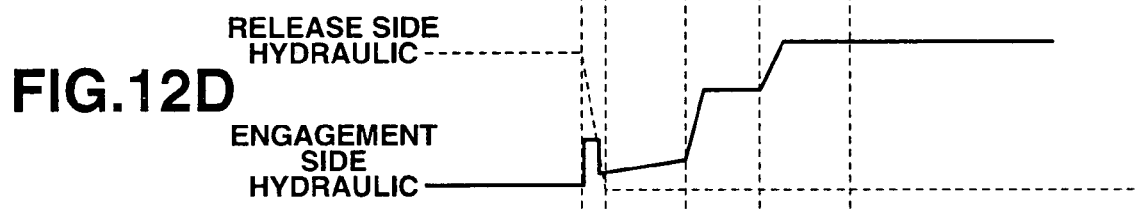
FIG.12D RELEASE SIDE HYDRAULIC / ENGAGEMENT SIDE HYDRAULIC
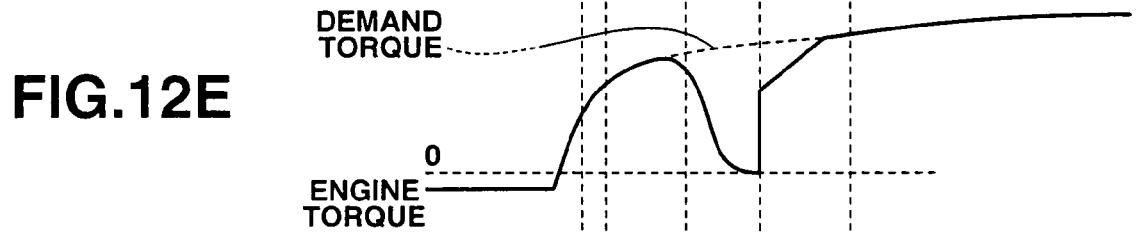
FIG.12E DEMAND TORQUE / ENGINE TORQUE
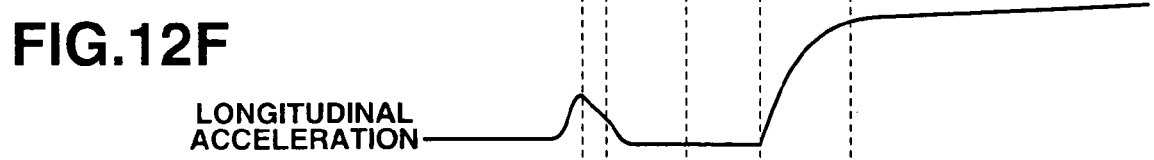
FIG.12F LONGITUDINAL ACCELERATION
t1 t13  t10   t7    t8

FIG.13A ACCELERATOR OPENING ANGLE (APO)

FIG.13B 3-rd SPEED SHIFT COMMAND / 2-nd SPEED

FIG.13C SYNCHRONIZATION REVOLUTION SPEED / INPUT REVOLUTION SPEED Nt / ENGINE SPEED Ne

FIG.13D RELEASE SIDE HYDRAULIC / ENGAGEMENT SIDE HYDRAULIC

FIG.13E DEMAND TORQUE / ENGINE TORQUE

FIG.13F LONGITUDINAL ACCELERATION t1 t13  t10  t7  t8

SHIFT CONTROL APPARATUS AND METHOD FOR AUTOMATIC TRANSMISSION

BACKGROUND OF THE INVENTION

1. Field of the Invention

The present invention relates to shift control apparatus and method for automatic transmission which are capable of controlling a shift operation of an automatic transmission (or. so-called, a shift change) in which release and engagement of a plurality of friction elements are carried out with a combination of the plurality of power transmitting friction elements (clutches) so that revolution speed and torque inputted from the engine are shifted at a shift ratio related to a target shift stage and the shifted engine speed and torque are outputted to road wheels.

2. Description of the Related Art

In a case where it becomes necessary to change a selected shift stage on the basis of a vehicular driver accelerator operation and a vehicle speed, the automatic transmission carries out a shift operation (the shift change). It is not always necessary to instantaneously carry out the shift operation. In an ordinary case, while a friction element (or a clutch) related to a presently selected shift stage is gradually released, another friction element related to a next selection scheduled target shift stage is gradually engaged. Then, both of the friction elements are temporarily slip engaged and, thereafter, the shift operation is finished. Or, a temporary neutral state is set with the friction element (or clutch) related to the presently selected shift stage released and the friction element related to a next scheduled target shift stage is engaged. Then, the shift operation is finished. This is because it is necessary to prevent a, so-called, engine racing and an abrupt variation of a road wheel driving force from occurring. However, in the automatic transmission in which the ordinary shift operation described above is carried out, the following inconveniences occur. That is to say, in the ordinary shift operation, it requires a considerable time until the shift operation is finished. Hence, even though an accelerator pedal is depressed by a driver who desires a vehicular acceleration, a vehicle cannot reach to a longitudinal acceleration direction that the driver has desired and an acceleration performance of the vehicle cannot be satisfied. Furthermore, a fuel consumption becomes worse. On the other hand, along with a development of a recent electronics control technique, a control technique as described in a Japanese Patent Application First (Tokkai) Publication No. Heisei 9-295528 published on Nov. 18, 1997 (which corresponds to a U.S. Pat. No. 5,839,989 issued on Nov. 24, 1998) has been proposed in which a quick (replacement) shift from one of the friction elements which is related to the presently selected shift stage to the other of the friction elements which is related to the next selection scheduled shift stage is carried out and each of the friction elements is controlled to finish the shift operation in a short period of time.

SUMMARY OF THE INVENTION

Objects to be controlled by means of the electronics control are movable parts such as friction elements, rotary shafts, and pumps operated by means of a hydraulic pressure or by means of a mechanical action. If electronics control is carried out without consideration of predetermined driving conditions such as a vehicle speed, an input torque from the engine to the automatic transmission, an accelerator pedal manipulation speed by the driver, a temperature (hereafter often called, an AT oil temperature) of a working liquid by means of which a liquid pressure required for the above-described friction elements to be released and engaged is supplied, mechanical elements cannot quickly follow a target shift control by means of the electronics control. In some cases, a shift shock occurs during the shift operation. A development of the shift shock worsens a vehicular ride comfort performance and is not favorable.

It is, therefore, an object of the present invention to provide shift control apparatus and method of an automatic transmission which are capable of effectively preventing a shift shock according to a driving state by inhibiting a quick shift operation from being carried out and, in place of the quick shift operation, by carrying out the ordinary shift operation under a driving state in which there is a possibility of an occurrence of the shift shock although it is a basic presumption that the automatic transmission is controlled to carry out a quicker shift operation than the ordinary shift operation.

According to one aspect of the present invention, there is provided with a shift control apparatus, comprising: an automatic transmission in which an engine speed is inputted; and a shift control section configured to perform a shift change in a shift stage of the automatic transmission to make a gear shift, configured to execute a shift revolution synchronization control in such a manner as to instantaneously release a shift purpose friction element which performs a power transmission through a presently selected shift stage and as to engage another shift purpose friction element which performs the power transmission through a next selection scheduled shift stage in synchronization with the engine speed, and configured to, in a case where the gear shift is made under a driving state in which there is a possibility of an occurrence of a shift shock, gradually release an engagement section which performs the power transmission through the presently selected shift stage and gradually engage another engagement section which enables the power transmission through the next selection scheduled shift stage without an execution of the shift revolution synchronization control.

According to another aspect of the present invention, there is provided a shift control method applicable to an automatic transmission in which an engine speed is inputted, the shift control method comprising: performing a shift change in a shift stage of the automatic transmission to make a gear shift; executing a shift revolution synchronization control in such a manner as to instantaneously release a shift purpose friction element which performs a power transmission through a presently selected shift stage and as to engage another shift purpose friction element which performs the power transmission through a next selection scheduled shift stage in synchronization with the engine speed; and, in a case where the gear shift is made under a driving state in which there is a possibility of an occurrence of a shift shock, gradually releasing an engagement section which performs the power transmission through the presently selected shift stage and gradually engaging another engagement section which enables the power transmission through the next selection scheduled shift stage without an execution of the shift revolution synchronization control.

This summary of the invention does not necessarily describe all necessary features so that the invention may also be a sub-combination of these described features.

BRIEF DESCRIPTION OF THE DRAWINGS

FIGS. 3A, 3B, 3C, 3D, 3E, and 3F are integrally a timing chart representing each operation of a shift revolution synchronization control in the first embodiment shown in FIG. 1.

FIGS. 4A, 4B, 4C, 4D, 4E, and 4F are integrally a timing chart representing each operation when the shift revolution synchronization control is executed in a state in which an input torque from an engine is large when a shift operation during a coast travel is carried out in the first embodiment shown in FIG. 1.

FIGS. 6A, 6B, 6C, 6D, 6E, and 6F are integrally a timing chart representing each operation of an ordinary shift control in the first embodiment shown in FIG. 1.

FIGS. 12A, 12B, 12C, 12D, 12E, and 12F are integrally a timing chart representing each operation when a vehicle is traveling on the coast run (travel) at a low speed in the case of the fourth embodiment shown in FIG. 11.

FIGS. 13A, 13B, 13C, 13D, 13E, and 13F are integrally a timing chart representing each operation when the shift revolution synchronization control is executed in a state in which the input torque from the engine is large during the coast travel (run) at the high speed in the fourth embodiment shown in FIG. 11.

DETAILED DESCRIPTION OF THE PREFERRED EMBODIMENTS

Reference will hereinafter be made to the drawings in order to facilitate a better understanding of the present invention.

Figure 1:
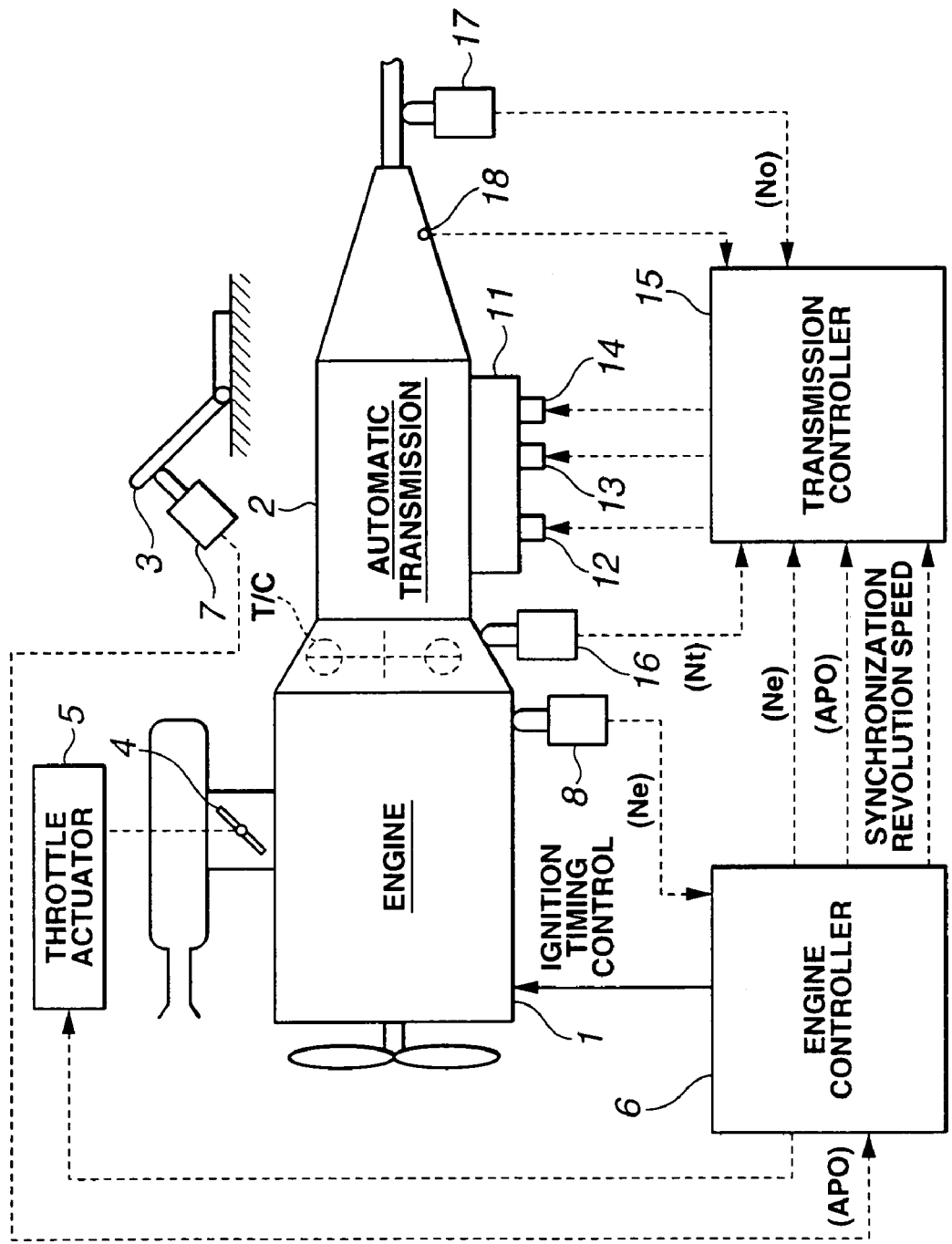
FIG. 1 is a system configuration view of a vehicular power train and its control system to which a shift control apparatus in a first preferred embodiment according to the present invention is applicable.

FIG. 1 shows a vehicular power train and its control system to which a first preferred embodiment of a shift control apparatus according to the present invention is applicable. In FIG. 1, a reference numeral 1 denotes an engine and a reference numeral 2 denotes an automatic transmission. The vehicular power train is constituted by engine 1 and automatic transmission 2, both of which being in a tandem connection. An output of engine 1 is adjusted by means of a throttle valve 4 whose opening angle (opening degree) is controlled independently of an accelerator pedal 3 operated by a vehicle driver and is inputted to automatic transmission 2 via a torque converter, as will be described later. The opening angle of throttle valve 4 of engine 1 is determined mainly according to a depression quantity of accelerator pedal 3 and is controlled by means of a throttle actuator 5. In addition, during a gear shift of automatic transmission 2, with the control of the shift operation as the object, an engine speed is adjusted as will be described later. A throttle opening angle (opening degree) control by means of a throttle actuator 5 is carried out by means of an engine controller 6. It is noted that a structure of automatic transmission 2 is exemplified by FIG. 1 of the U.S. Pat. No. 5,938,563 (the disclosure of which is herein incorporated by reference).

Engine controller 6 performs an ordinary engine control such as a fuel injection quantity control. Thus, engine controller 6 receives a signal from an accelerator opening angle sensor 7 to detect an opening angle APO of accelerator pedal 3 and a signal from an engine speed sensor 8 to detect an engine speed Ne, ordinarily derives a normal target engine speed tNe in accordance with a vehicle driving state such as accelerator opening angle (degree) APO and engine speed Ne, and performs an engine output control including a fuel injection quantity control and an ignition timing control to achieve this.

Automatic transmission 2 is of a direct coupling type which directly drives a working liquid pressure to be supplied to shift purpose friction elements such as liquid pressure clutches to determine a power transmitting route (shift stage) of a wheel transmission system and liquid pressure driven brakes. Thus, working liquid pressure duty solenoids 12, 13, and 14 are inserted into control valves 11 for gear shift purposes by the corresponding numbers of shift purpose friction elements. These working liquid pressure duty solenoids 12, 13, and 14 perform the working liquid pressures for individually corresponding friction elements and selectively engage the friction elements so that automatic transmission 2 can be in a predetermined shift stage selected state. Then, automatic transmission 2 performs a gear shift and outputs an engine power at a gear ratio corresponding to the selected shift stage. Drive duties of duty solenoids 12, 13, and 14 determine these by means of transmission controller 15. This transmission controller 15 inputs accelerator opening angle (APO) and engine speed (Ne) signals from sensors 7, 8 via engine controller 6. In addition, transmission controller 15 inputs a signal from an input revolution sensor 16 to detect an input revolution number Nt inputted to automatic transmission 2 from an input revolution speed sensor 16 and a signal from an output revolution speed sensor 17 to detect an output revolution speed No of automatic transmission 2.

Transmission controller 15 performs a gear shift control for automatic transmission 2 by executing a well known control program (not shown) on the basis of the inputted information. First, automatic transmission controller 15 derives an suitable shift stage for a present driving state on the basis of a scheduled shift pattern (not shown) from a vehicle speed (VSP) determined according to a calculation from transmission output revolution speed No and accelerator opening angle (APO). Then, if the suitable shift stage is coincident with a presently selected shift stage, automatic transmission controller 15 does not output a shift command determining that the shift is not carried out. Thus, drive duty ratios of duty solenoids 12, 13, and 14 retain the present state and maintains the presently selected shift stage. However, if the presently selected shift stage is different from the suitable shift stage, automatic transmission controller 15 outputs the shift command to change the drive duty of the corresponding one of duty solenoids 12, 13, and 14 so that an engagement-and-release switch of shift purpose friction elements to perform the shift change from the presently selected shift stage to the suitable shift stage is executed.

Figure 2:
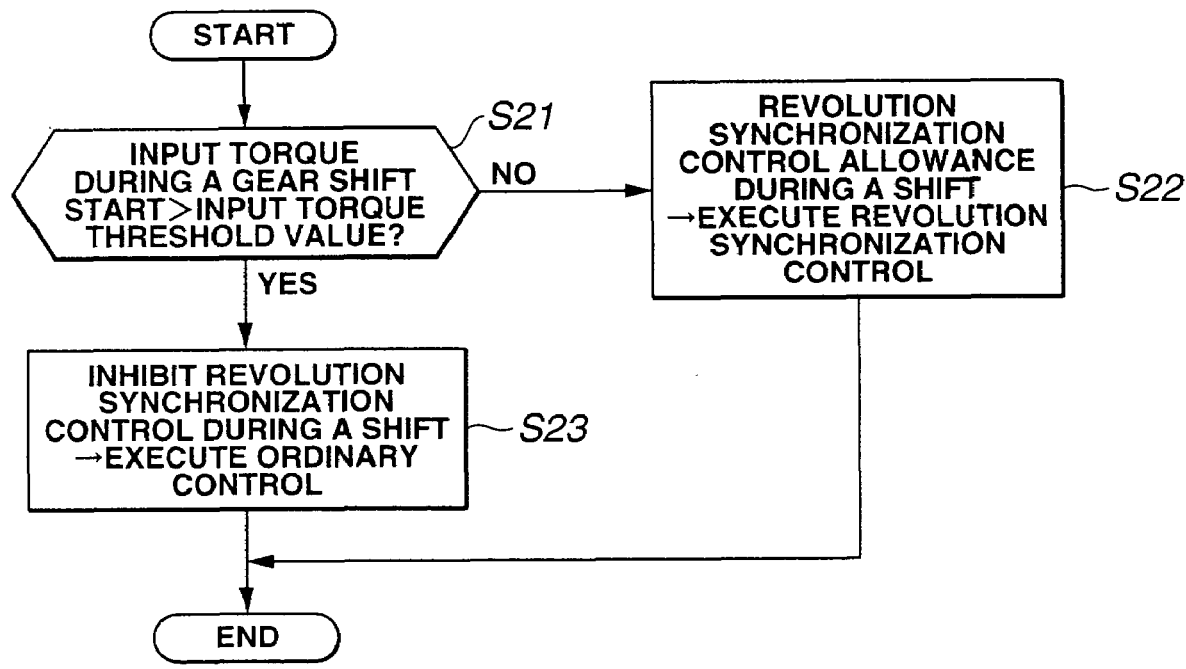
FIG. 2 is a flowchart representing a control program to be executed during a shift operation by the shift control apparatus in the first embodiment shown in FIG. 1.
Figure 5A:
FIGS. 5A, 5B, 5C, 5D, 5E, and 5F are integrally a timing chart representing each operation when the shift revolution synchronization control is executed in a state in which the input torque from the engine is large when the shift operation during the traveling with a slight acceleration tendency in the first embodiment shown in FIG. 1.
Figure 5B:
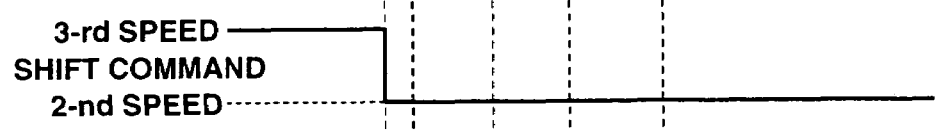
Figure 5C:
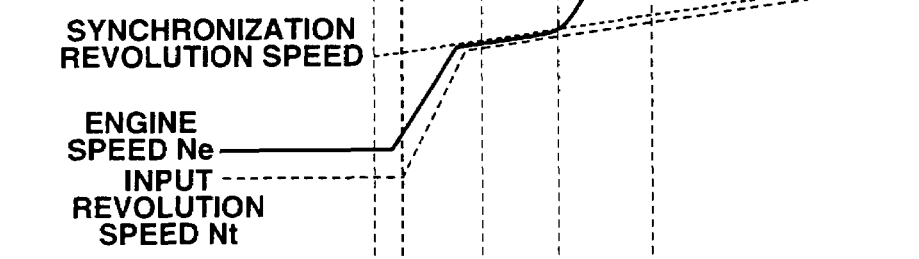
Figure 5D:
Figure 5E:
Figure 5F:
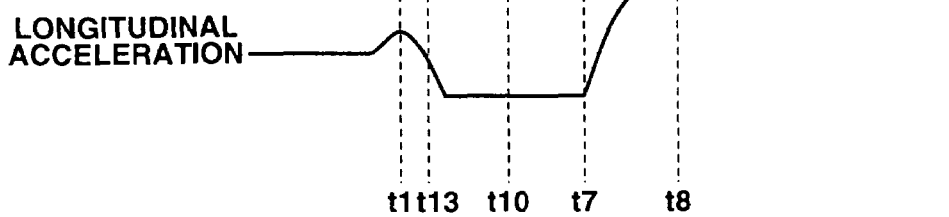

FIG. 2 shows a flowchart representing a control executed by automatic transmission controller 15 and engine controller 6 when automatic transmission 2 performs the gear shift. At a first step S21, automatic transmission controller 15 outputs the shift command. If the suitable shift stage is different from the presently selected shift stage, namely, during a shift start, automatic transmission controller 15 calculates an input torque actually inputted to automatic transmission 2 from engine 1 and determines whether this input torque is lower than a predetermined threshold value. This input torque can be calculated by referring to a map (not shown) with accelerator opening angle APO, engine speed Ne, and input revolution speed Nt as parameters.

If the input torque does not reach to the predetermined threshold value (No) at step S21, the routine goes to a step S22 at which such a shift revolution synchronization control that a quick (replacement) shift from one of the friction elements related to the presently selected shift stage to another of the friction elements which is related to a next selection scheduled shift stage is made and the shift operation is finished in a short period of time is executed and the present control is ended. It is noted that the shift revolution synchronization control is not merely the quick (replacement) shift operation but a synchronization revolution speed between engine speed Ne and input revolution speed Nt is calculated from the next selection scheduled shift stage and so forth and this (replacement) shift operation is carried out in synchronization with this synchronization revolution speed. FIGS. 3A through 3F integrally show a timing chart representing an aging variation of a driving state (accelerator opening angle APO, a gear shift stage command value), the working liquid pressure of each friction element, an engine torque of engine 1, a longitudinal acceleration of the vehicle in the shift revolution synchronization control.

The shift revolution synchronization control will be described on the basis of the timing chart in FIGS. 3A through 3F. For example, if a driver depresses accelerator pedal 3, accelerator opening angle (APO) is increased as denoted by a solid line shown in FIG. 3A. Automatic transmission controller 15 changes the suitable shift stage along with the augmented accelerator opening angle and outputs the shift command to make a downshift from, e.g., a third speed stage (third-speed shift range) to a second shift stage (second-speed shift range) at a time point t1 as shown by a solid line in FIG. 3B. at the same time, the working liquid pressure (release side hydraulic) which has engaged with the friction element related to the presently selected shift stage is quickly set to an approximately 0% (complete release). A release side hydraulic is abruptly reduced from a time point t1 to a time point t2 as denoted by a broken line in FIG. 3C. Then, at a time point of t2, the working liquid pressure (the release side hydraulic) is reduced to approximately 0%.

Along with an increase in accelerator opening angle (opening degree) APO, engine speed Ne outputted from engine 1 is started to be raised at a proximity to a passage of time point t1. In the shift revolution synchronization control, the synchronization revolution speed which provides a target of both of engine speed Ne and input revolution speed Nt on the basis of the suitable shift stage and the vehicle speed is calculated. This synchronization revolution speed is outputted to engine controller 6 with this synchronization revolution speed as target engine speed tNe. The vehicle speed is determined from output revolution speed No. The synchronization revolution speed is increased at a moderate gradient as denoted by a dot line in FIG. 3C. During a process of shift control after time point t1, engine controller 6 calculates a deviation between the synchronization revolution speed and engine speed Ne, carries out a feedback control on the basis of this deviation, and gives an opening angle command for throttle valve 4 to throttle actuator 5. Engine speed Ne is raised as denoted by a solid line in FIG. 3C after time point t1. However, engine speed Ne is not raised with a large separation from the synchronization revolution speed. Thus, an engine racing in a no load state of engine 1 can previously be prevented.

Engine speed Ne follows the synchronization revolution speed at about time point t7 after engine speed Ne is made coincident with the synchronization revolution speed. The feedback control of engine speed Ne is continuously executed until time point t7.

In this way, while engine speed Ne is controlled, transmission controller 15 increases the working liquid pressure (engagement side hydraulic) for the friction element related to the suitable shift stage to be engaged in synchronization with the synchronization revolution speed from approximately 0% (complete release) so that input revolution speed Nt for automatic transmission 2 is made coincident with the synchronization revolution speed. The engagement side hydraulic is increased after time point t1 as denoted by the solid line in FIG. 3D. Along with this, input revolution speed Nt is increased after a time point t2 as denoted by a dot line in FIG. 3C and is made coincident with the synchronization revolution speed as denoted by the dot line in FIG. 3C at a time point t6. It is noted that an instantaneous projection of the engagement side hydraulic at time point t1 serves to block a in-rush resistance during an initial stage of the shift operation.

From time point t6 to time point t7, engine speed Ne and input revolution speed Nt are made coincident with the synchronization revolution speed. During this interval of time, the engine torque is once zeroed as denoted by a solid line of FIG. 3E. After time point t7, the engagement side hydraulic is furthermore increased to approximately 100% (complete engagement). The friction element related to the suitable shift stage is completely engaged and the (instantaneous draw (drain)) shift revolution synchronization control is completed.

According to the shift revolution synchronization control, the engine torque is increased after time point t2 in accordance with the demand torque of the vehicle driver and reaches to a maximum at time point t6. However, since the engine torque reaches to a minimum at the subsequent time point t7, the instantaneous engine torque is once reduced over the demand torque of the driver as denoted by the broken line of FIG. 3E. After a subsequent time point t8, the engine torque is again coincident with the demand torque of the driver. In addition, the vehicular longitudinal acceleration is approximately zeroed from time point t1 to time point t7. At this time, no shift shock occurs. The friction element related to the suitable shift stage after time point t7 starts to transmit a drive torque to a downstream side of the drive transmission route. Hence, the vehicular longitudinal acceleration is increased after time point t7 and a steady state acceleration is obtained after a time point t8 at which the shift revolution synchronization control is completed. As described above, it is possible to shorten a shift operation required time Td from time point (t1) at which the shift is started to time point (t8) at which the shift is completed than a shift operation required time Ts in the ordinary shift operation, thereby enabling a contribution on an acceleration performance and an improvement in a fuel consumption.

Referring back to step S21 in FIG. 2, in a case where the input torque during the shift start is larger than the predetermined threshold value (Yes), the routine goes to a step S23. At step S23, automatic transmission controller 15 inhibits the shift revolution synchronization control described above and carries out the ordinary shift control such that a gradual shift change from the friction element related to the presently selected shift stage to the friction element related to the next selection scheduled shift stage is carried out and the routine is ended. It is noted that the predetermined threshold value of the input torque described at step S21 is, for example, 100 Nm.

The reason of inhibiting the shift revolution synchronization control will be described below on the basis of two driving states. First, a case where accelerator pedal 3 is largely depressed during a coast travel which is one of the two driving states of engine 1 will be described with reference to FIG. 4. The coast travel is also called an inertia travel in which the vehicle is traveling with the vehicular longitudinal acceleration in the approximately zero state. Then, the routine shown in FIG. 2 is ended. In a case where accelerator pedal 3 is largely depressed, the engine torque is already augmented at time point of t1 as denoted by the solid line in FIG. 4D. In this case, suppose that the shift revolution synchronization control is executed. As denoted by the solid line of FIG. 4D, the engagement side hydraulic is once raised at time point of t1. Hence, the vehicular longitudinal acceleration is once projected toward a maximum (refer to FIG. 4F) at time point t1. In this case, if the above-described shift revolution synchronization control is executed, the engagement side hydraulic is once raised at time point of t1 as denoted by the solid line of FIG. 4D. This projection is the shift shock and gives an ill effect on the vehicular ride comfort.

Next, a case where accelerator pedal 3 is largely depressed during the travel with the slight acceleration which is the other of the two driving states will be described below on the basis of FIGS. 5A through 5F. In a case where accelerator pedal 3 is largely depressed at time point t1, the engine torque is already increased at time point of t1 as denoted by the solid line of FIG. 5 and is increased after a subsequent time point t13. In this case, if the shift revolution synchronization control is executed, the engagement side hydraulic is once raised at time point t1, as denoted by a solid line in FIG. 5D. Hence, the vehicular longitudinal acceleration is once projected at a time point of t1 and the shift shock occurs at the time at which the shift is started. Especially, in this case, if the large engine torque occurs before time point of t13 at which accelerator pedal 3 is largely depressed, the neutral state occurs from a time point t10 to a time point t7. The engine torque is once returned to zero as denoted by the solid line of FIG. 5F and a largely negatively going abrupt acceleration shock (a, so-called, a sudden jolt) occurs in the vehicular longitudinal acceleration. Hence, the shift shock becomes large as compared with the case where the coast travel is found as shown in FIGS. 4A through. 4F and as compared with the case of the above-described coast travel. The vehicular ride comfort performance is furthermore damaged.

As accelerator pedal 3 is largely depressed and as the input torque becomes large, the shift shock becomes large. Hence, in this embodiment, the threshold value is provided for the input torque and the shift revolution synchronization control is inhibited. Referring back to the description on step S23, the ordinary shift control will be described with reference to FIGS. 6A through 6F. For example, if the driver depresses accelerator pedal 3, the accelerator opening angle is increased as denoted by the solid line of FIG. 6A. For example, if accelerator pedal 3 is largely depressed by the driver, accelerator opening angle (APO) is increased as denoted by the solid line of FIGS. 6A through 6F. Automatic transmission controller 15 varies the suitable gear shift stage along with the increase in the accelerator opening angle whose opening angle is increased as denoted by the solid line shown in FIG. 6A. Automatic transmission controller 15 varies the suitable shift stage along with the change in the accelerator opening angle whose opening angle is increased and outputs a shift command to make the downshift as denoted by the solid line shown in FIG. 6B. At the same time, the release side hydraulic is somewhat quickly decreased from time point t1 to time point t2 as denoted by the dot line in FIG. 6D. After time point t2, the release side hydraulic is gradually decreased as denoted by the dot line shown in FIG. 6D. Then, the engagement side hydraulic is gradually increased from time point t1 as denoted by the solid line of FIG. 6D. Both of the release side and engagement side hydraulics are reversed at time point t3, as shown in FIG. 6D.

In addition, along with the increase of throttle (valve) opening angle TVO based on the accelerator opening angle, engine speed Ne outputted from engine 1 is started to be raised after about the passage of time point t1 as shown in FIG. 6C. In the ordinary gear shift, throttle opening angle (TVO) is determined uniquely on the basis of accelerator opening angle (APO).

As described above and as shown in FIG. 6D, the release side hydraulic is decreased from approximately 100% (complete engagement) to approximately 0% (complete release) as denoted by the dot line of FIG. 6D. The engagement side hydraulic is gradually increased from approximately 0% (complete release) to approximately 100% (complete engagement) as denoted by the solid line of FIG. 6D. While a state of a slip engagement is maintained at an interval of time before time point t1 shown in FIGS. 6A through 6F, the shift stage is replaced. Accordingly, input revolution speed Nt is increased at the revolution speed slightly smaller than engine revolution speed Ne after time point t2. It is noted that the instantaneous projection of the engagement side hydraulic is made at time point t1 is to block the working liquid pressure from the rush resistance during the initial stage of the ordinary shift control.

After time point t4, the release side hydraulic is furthermore decreased toward approximately 0% and the engagement side hydraulic is furthermore increased to approximately 100%. The friction element related to the suitable shift stage is completely engaged and the ordinary shift control is finished.

The engine torque is decreased as denoted by the solid line of FIG. 6E before time point t4 and after time point t3 and becomes once smaller than the demand torque by the driver. However, at this time, the engine torque is not zeroed. After time point t4, the engine torque is again made coincident with the demand torque after time point t4 in FIG. 6E. In addition, the vehicular longitudinal acceleration is not once projected during the shift start. The shift shock is not generated. The vehicular longitudinal acceleration is increased after time point t2 and once decreased at time point t4. However, after time point t4, the vehicular longitudinal acceleration is once decreased. After time point t5 in FIG. 6F at which the shift control is finished, the ordinary acceleration is obtained.

Figure 7:
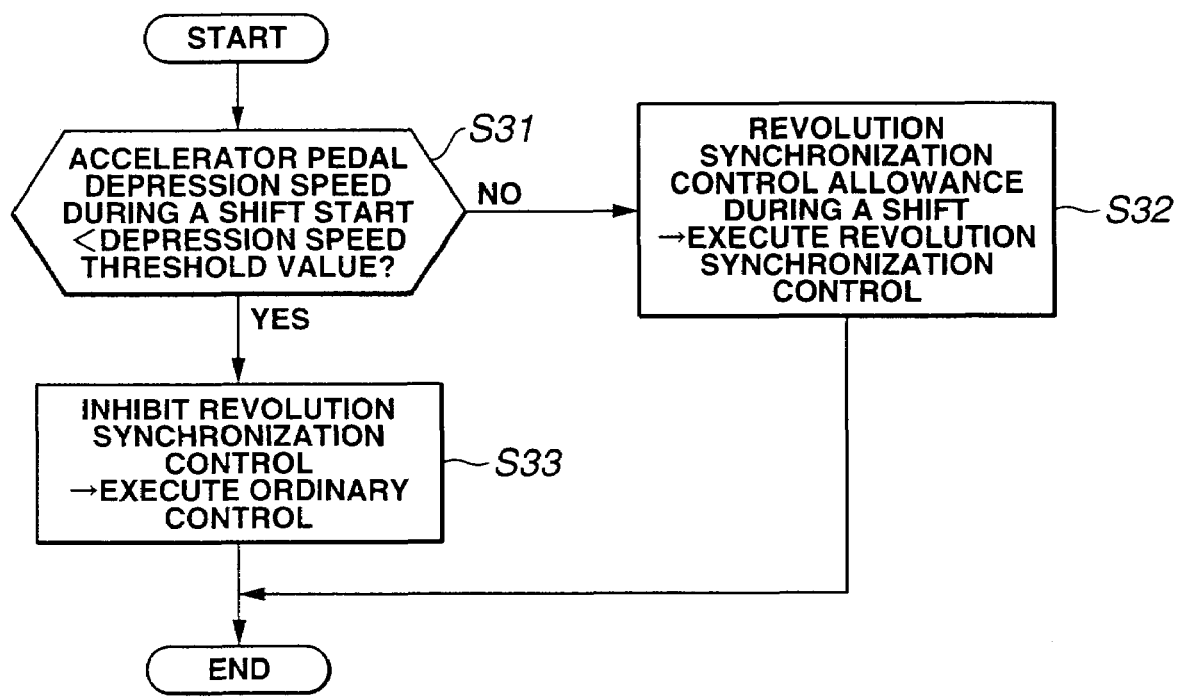
FIG. 7 is a flowchart representing a control program executed during the shift operation by the shift control apparatus in a second preferred embodiment according to the present invention.

According to the first embodiment of the shift control apparatus shown in FIG. 2, the threshold value is provided for the input torque inputted to automatic transmission 2 from engine 1. In the driving state in which the input torque is larger than the above-described threshold value, the shift revolution synchronization control is inhibited and the ordinary shift control is carried out. Hence, even in a case where the input torque is large, the shift shock is not developed at about time point t1. Consequently, the vehicular ride comfort is not damaged. It is noted that the driving state for the ordinary shift control to be carried out is not limited to the case where the input torque is large. If the driving state in which there is a possibility of the occurrence of the shift shock is present, such a shift control that inhibits the shift revolution. synchronization control can be applied. As another driving state in which the shift shock may occur, a quick depression of accelerator pedal 3 may be considered. FIG. 7 shows a flowchart representing a second embodiment of the shift control apparatus according to the present invention which inhibits the shift revolution synchronization control on the basis of the depression speed of accelerator pedal 3.

First, at a step S31, automatic transmission controller 15 outputs the shift command. If the suitable shift stage is different from the presently selected shift stage, namely, if the gear shift of automatic transmission 2 is started, automatic transmission controller 15 detects the depression speed of accelerator pedal 3 and determines whether this depression speed is slower than a predetermined threshold value of the depression speed. The depression speed can be calculated by differentiating the accelerator opening angle detected by accelerator pedal opening angle sensor 7 with respect to time. It is noted that the predetermined threshold value of the depression speed is, for example, 8/8[opening degree (angle)]/0.5 [s].

In a case where the depression speed of accelerator pedal 3 during the shift start is not slower than the predetermined threshold value (No), namely, when the depression speed is equal to or faster than the predetermined threshold value (No at step S31), the shift revolution synchronization control is executed so that the quick (replacement) shift from the friction element related to the shift stage under the presently selected shift stage to the friction element related to the next selection scheduled shift stage is made and the present routine is ended.

The driving state in the shift revolution synchronization control in this embodiment (the accelerator opening angle and the gear stage command value), the aging variations of the working liquid pressure of each friction element, of the engine torque of engine 1, and of the vehicular longitudinal acceleration are the same as those shown in the timing chart shown in FIGS. 3A through 3F. These contribute to the improvements in the acceleration performance and fuel consumption.

Whereas, at step S31, if the depression speed during the shift start is slower than the predetermined threshold value (Yes), namely, in a case where the depression speed is slower than the predetermined threshold value of the depression speed, the routine goes to a step S33. At step S33, the shift revolution synchronization control is inhibited and such the ordinary shift control that the gradual shift from the friction element related to the presently selected shift stage to the friction element related to the next selection scheduled shift stage is made is carried out and the present control is ended. The driving state (the accelerator opening angle and the gear shift stage command value) in the ordinary shift control of this embodiment, the aging variations of the working liquid pressures of respective friction elements, the engine torque of engine 1, and the vehicular longitudinal acceleration are the same as those shown in FIGS. 6A through 6F. Hence, the vehicular ride comfort cannot be worsened.

Figure 8A:
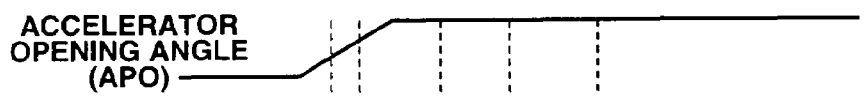
FIGS. 8A, 8B, 8C, 8D, 8E, and 8F are integrally a timing chart representing each operation when a shift revolution synchronization control is executed in a state in which an accelerator pedal depression speed is slow in the case of the second embodiment shown in FIG. 7.
Figure 8B:
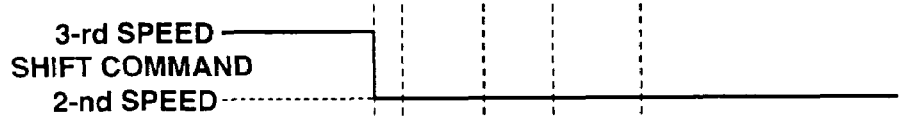
Figure 8C:
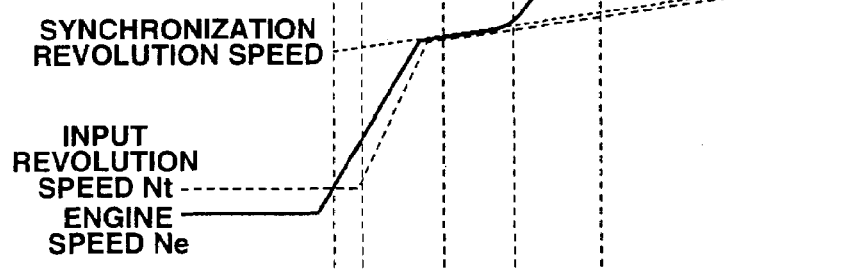
Figure 8D:
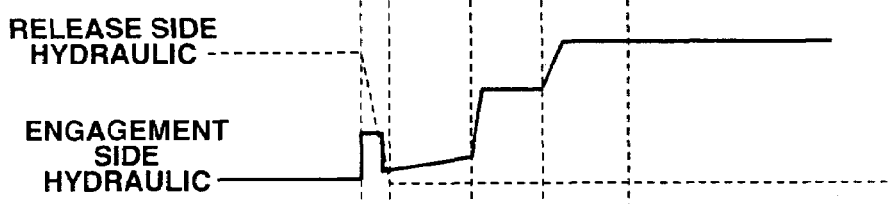
Figure 8E:
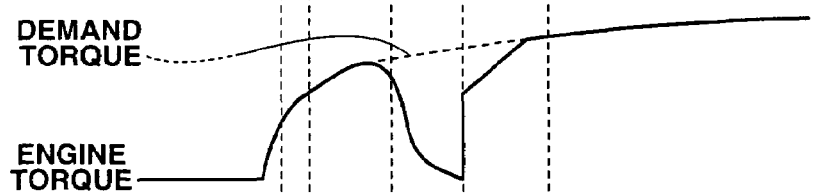
Figure 8F:
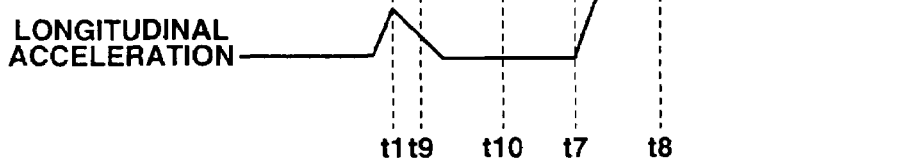

The reason of inhibiting the shift revolution synchronization control will be described below. In a case of the driving state where the depression speed of accelerator pedal 3 is slow, accelerator opening angle (APO) is moderately increased before and after time point t1 and subsequent time point t9 as denoted by the solid line shown in FIG. 8A. Thus, the engine torque is already increased at time point t1 as denoted by the solid line of FIG. 8E. In this case, if the shift revolution synchronization control is executed, the engagement side hydraulic is once raised between time points t1 and t9 as denoted by the solid line of FIG. 8D. The vehicular longitudinal acceleration is projected by obtaining once the maximum at time point t1 as denoted by the solid line shown in FIG. 8F. This projection is, namely, the shift shock and damages the vehicular ride comfort. Therefore, the threshold value is provided for the accelerator pedal depression speed and the shift revolution synchronization control is inhibited and, in place of the shift revolution synchronization control, the ordinary shift control is carried out. Therefore, even if the depression speed of accelerator pedal 3 is slow, the shift shock does not occur at about time point t1 and the vehicular ride comfort is not damaged. It is noted that the driving state in which the shift revolution synchronization control is inhibited and in which the ordinary shift control is carried out is not limited to the cases where the input torque is large as described above and as shown in FIG. 2 and where the accelerator depression speed is slow as described above and as shown in FIG. 7. Such a shift control that the shift revolution synchronization control is inhibited can be applied to any driving state in which there is a possibility of the occurrence of the shift shock.

Figure 9:
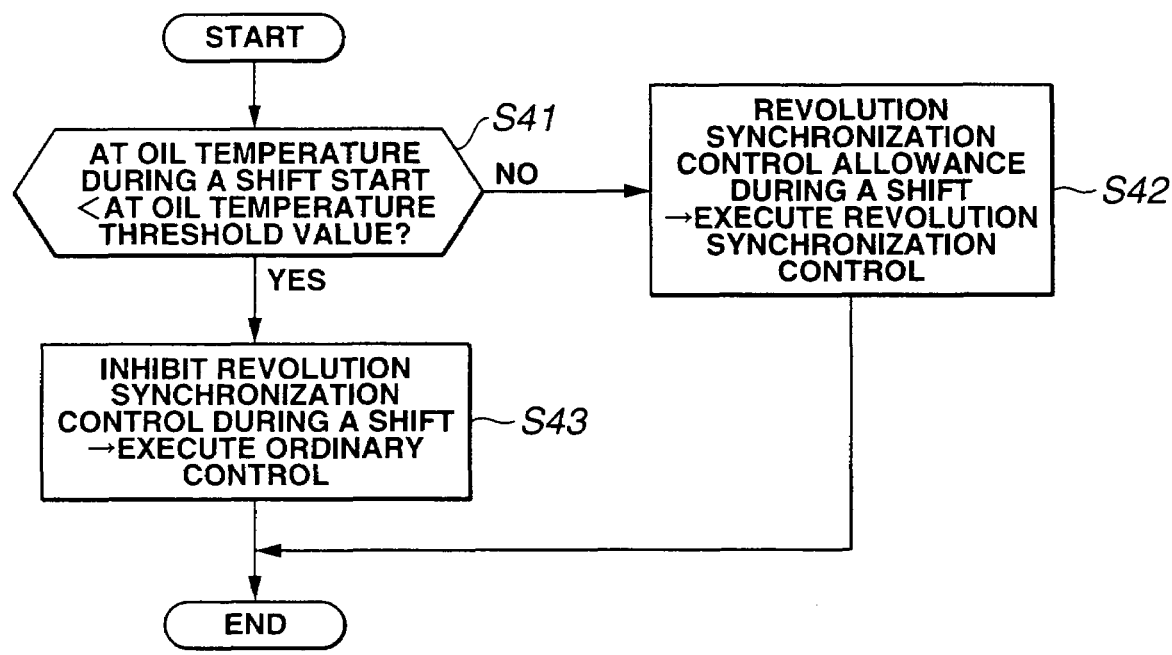
FIG. 9 is a flowchart representing a control program executed for the shift control apparatus to be executed during the shift operation in a third preferred embodiment according to the present invention.

Another driving state in which there is a possibility of the occurrence of the shift shock may include a low temperature of the working liquid pressure (hereinafter, referred to as an AT oil temperature) during the shift start. FIG. 9 shows a flowchart representing a case where the shift revolution synchronization control is inhibited on the basis of the AT oil temperature in a third preferred embodiment of the shift control apparatus according to the present invention. At a step S41, transmission controller 15 outputs a gear shift command, detects the AT oil temperature of the working liquid pressure when the suitable shift stage is different from the presently selected shift stage, namely, during the gear shift start, through an AT oil temperature sensor 18, and determines whether the detected AT oil temperature is lower than a predetermined AT oil temperature threshold value.

If the AT oil temperature during the shift start is not lower than a predetermined threshold value of the AT oil temperature (No), namely, if the AT oil temperature is equal to or higher than the predetermined threshold value, the routine goes to a step S42. At step S42, automatic transmission controller 15 executes the shift revolution synchronization control and the quick (replacement) shift from the friction element related to the presently selected shift stage to the friction element related to the next selection scheduled shift stage is made using the shift revolution synchronization control and the present control is ended. It is noted that the predetermined threshold value of the AT oil temperature is, for example, 20° C.

The driving state in the shift revolution synchronization control described in the third embodiment (accelerator opening angle and gear shift stage command value), the aging variations of the working liquid pressure of each friction element, the engine torque of engine 1, and the vehicular longitudinal acceleration are the same as those shown in the timing chart of FIGS. 3A through 3F and described above and these contribute on the improvements in the acceleration performance and the fuel consumption.

On the other hand, if, at step S41, the AT oil temperature during the shift start is lower than the predetermined threshold value (Yes), namely, when the AT oil temperature is low, the shift revolution synchronization control is inhibited, the ordinary shift control such that the gradual (replacement) shift from the friction element related to the presently selected shift stage to the friction element related to the next selection shift stage is made is carried out, in place of the shift revolution synchronization control, and the present control is ended. The driving state (the accelerator opening angle and the gear shift stage command value) in the ordinary shift control, the aging variations of the working liquid pressure of each friction element, the engine torque of engine 1, and the vehicular longitudinal acceleration are the same as those shown in FIGS. 6A through 6F as described above and do not worsen the vehicular ride comfort performance.

Figure 10A:
FIGS. 10A, 10B, 10C, 10D, 10E, and 10F are integrally a timing chart representing each operation when the shift revolution synchronization control is executed in a state where an AT oil temperature is relatively low in the third embodiment shown in FIG. 9.
Figure 10B:
Figure 10C:
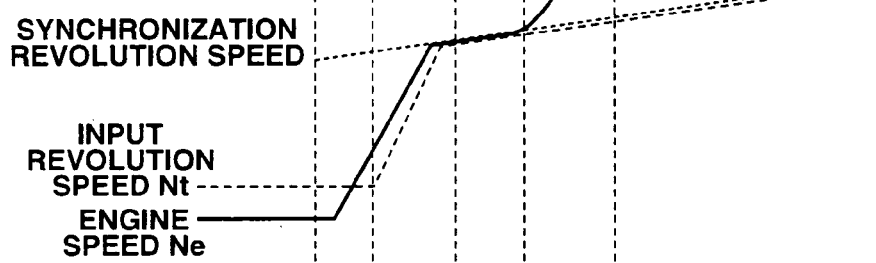
Figure 10D:
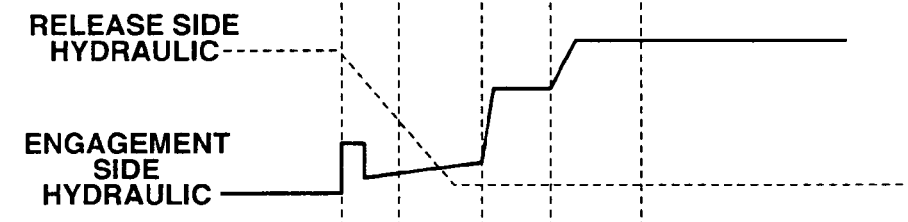
Figure 10E:
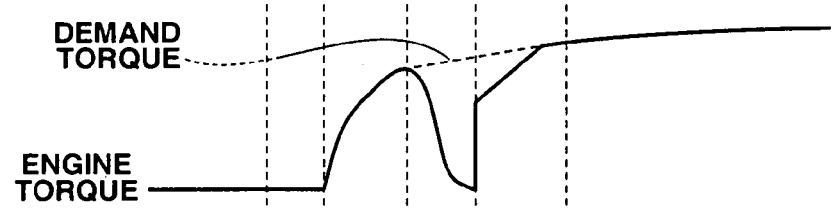

The reason that the shift revolution synchronization control is inhibited will be described below. If the shift is carried out in a case where the AT oil temperature is lower than the threshold value, a viscosity of the working liquid is high and the release side hydraulic is moderately decreased from time point t1 to time point t6 as denoted by the dot line of FIG. 10D and an instantaneous draw (or drain) of the working liquid is not carried out. Hence, if the shift revolution synchronization control is executed, the engine torque is increased from time point t2 as denoted by the solid line of FIG. 10F. The vehicular longitudinal acceleration once indicates a (local) maximum between time points t2 through t6 as denoted by the solid line of FIG. 10F. This (local) maximum corresponds to the shift shock and damages the vehicular ride comfort performance. Therefore, the above-described threshold value is provided for the AT oil temperature and the shift revolution synchronization control is inhibited.

Figure 10F:

In the embodiment as described above and shown in FIG. 9, the predetermined threshold value is provided for the AT oil temperature. In this case, the shift revolution synchronization control is inhibited and the ordinary shift control is carried out. Hence, in the driving state in which the AT oil temperature is lower than the predetermined threshold value, the shift revolution synchronization control is inhibited and the ordinary shift control is carried out. Hence, even if the temperature (AT oil temperature) of the working liquid to operate the friction elements is low, the shift shock is not developed at about time point t1 (as shown in FIG. 10F) and the vehicular ride comfort performance is not worsened. It is noted that the driving state in which the shift revolution synchronization control is inhibited and the ordinary shift control is carried out includes: the case where the input torque is large as described above and as shown in FIG. 2; the case where the accelerator depression speed is slow as described above and as shown in FIG. 7; and the case where the AT oil temperature is low as described above and as shown in FIG. 9. However, the present invention is not limited to these cases. The present invention in which the shift control which inhibits the shift revolution synchronization control is carried out is applicable to any driving state in which there is a possibility of the occurrence of the shift shock. The determination of the driving state in which there is a possibility of the occurrence of the shift shock is based on a combination of conditions of the input torque, the accelerator pedal depression speed, and the AT oil temperature. The shift control apparatus in a fourth preferred embodiment according to the present invention which is based on the above-described combination will be described with reference to a flowchart of FIG. 11. First, at a step S1, automatic transmission controller 15 outputs the down-shift command in response to the depression of accelerator pedal 3 by the driver and determines whether the suitable shift stage is different from the present selection shift stage. If automatic transmission controller 15 does not output the down-shift command (No at step S1), the present control is ended and automatic transmission controller 15 monitors whether the down-shift command output is subsequently carried out. If, at step S1, the down-shift command is carried out (Yes), the routine goes to a step S2. At step S2, automatic transmission controller 15 reads the engine torque outputted from engine 1 and a torque ratio of a torque converter T/C and calculates input torque Tin by multiplying the engine torque by the torque ratio. The torque ratio can be estimable from engine speed Ne and input revolution speed Nt.

At the next step S3, automatic transmission controller 15 reads a pattern (shift kind) of the down-shift determined by the selected shift stage before the shift and the selection shift stage after the shift and the vehicle speed. Automatic transmission controller 15 searches input torque threshold value Tinkyoka from a map previously stored with the read values as parameters. The vehicle speed is calculated from output revolution speed No.

Herein, a reason of determining input torque threshold value Tinkyoka on the basis of the vehicle speed will be described below. FIGS. 12A through 12F integrally show a timing chart in a case where the vehicle is traveling at a low speed and during the coast traveling the large input torque is inputted to automatic transmission 2. FIGS. 13A through 13F integrally show a timing chart in a case where the vehicle is traveling at a high speed during the coast traveling and the large input torque is inputted to automatic transmission 2. In the same selection shift stage (the same shift kind), as the vehicle speed becomes higher, a coast torque (also called, an engine brake) becomes larger. Hence, the input torque during the shift start becomes different from each other in the case of FIGS. 12A through 12F and in the case of FIGS. 13A through 13F. If both of the torques are compared, the engine torque denoted by the solid line in FIG. 12E is slightly in a minus side (lower direction of FIG. 12E) than zero line (0) before time point t1. Consequently, a rise in the engine torque at time point t1 becomes, as shown in FIG. 12E, large toward a plus side (upper direction in FIG. 12E). On the other hand, the rise of the engine torque denoted by the solid line in FIG. 13E is largely positioned toward the minus side (lower direction of FIG. 13E) than the zero line (dot line in FIG. 13E). Consequently, at time point t1 at which the rise in the engine torque occurs, the engine torque becomes approximately zeroed, as shown in FIG. 13E.

The vehicular longitudinal acceleration shown in the solid line of FIG. 12F is largely projected before and after time point t1 and the shift shock is accordingly large. On the other hand, the vehicular longitudinal acceleration denoted by the solid line in FIG. 13F is projected before and after time point t1. However, the degree of the projection in the case of FIG. 13F is not so large as denoted by the solid line of FIG. 12F. The shift shock is relatively small. According to the above reason, as the vehicle speed becomes lower, input torque threshold value Tinkyoka is determined to become smaller.

In addition, at the same vehicle speed, as the selection shift stage (shift kind) becomes lower gear ratio, the coast torque (engine brake) becomes larger and the shift shock becomes smaller. On the contrary, at the same vehicle speed, as the selection shift stage (shift kind) becomes higher gear ratio, the coast torque (engine brake) becomes smaller and the shift shock becomes large. Hence, as the shift kind becomes higher gear ratio, input torque threshold value Tinkyoka is determined to be smaller.

Figure 11:
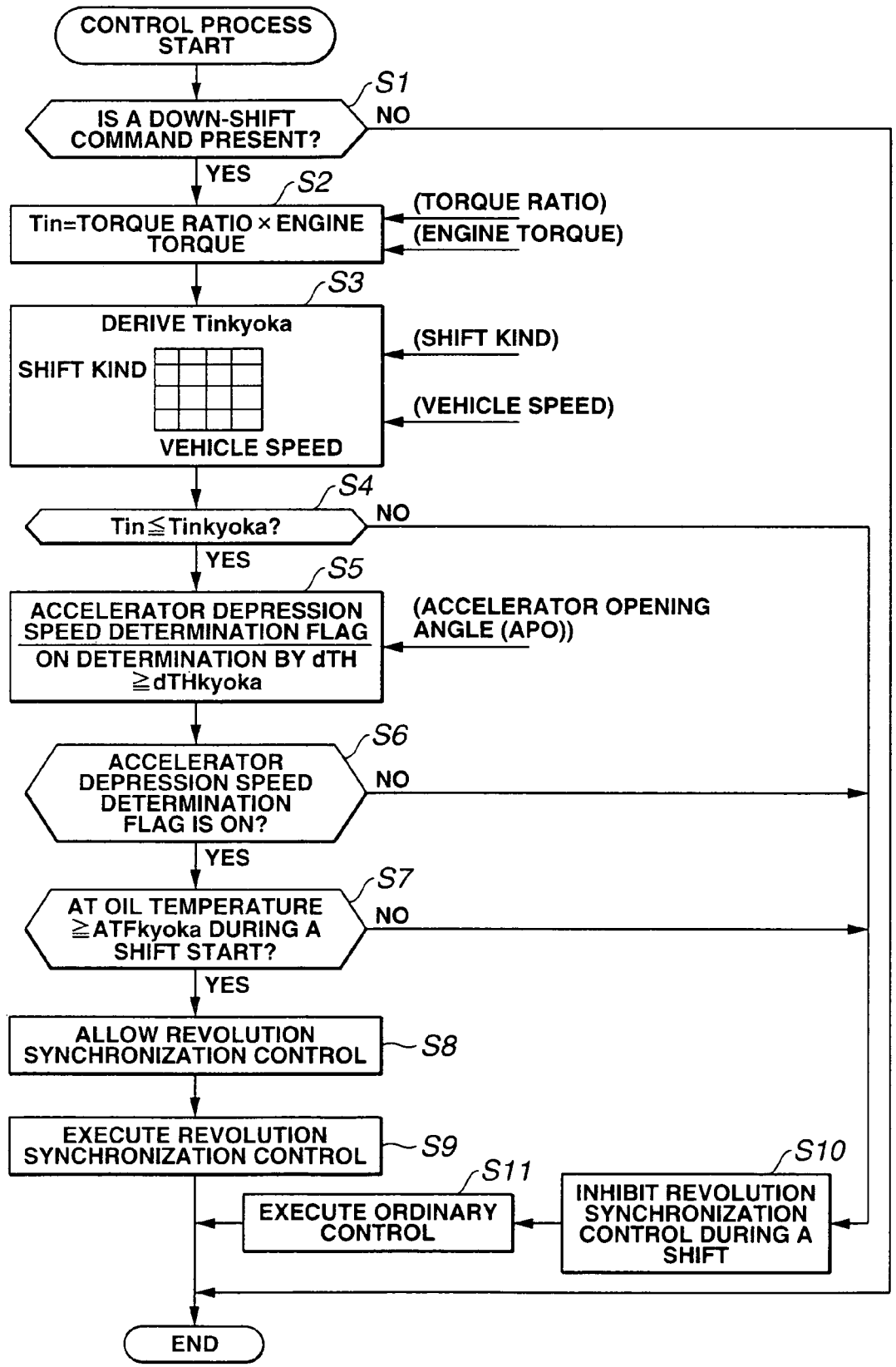
FIG. 11 is a flowchart representing a control program executed during the shift operation by the shift control apparatus in a fourth preferred embodiment according to the present invention.

Referring back to the flowchart of FIG. 11, if input torque threshold value Tinkyoka is derived at step S3, the routine shown in FIG. 11 goes to a step S4. At step S4, automatic transmission controller 15 determines whether input torque Tin during the shift start is equal to or smaller than input torque threshold value Tinkyoka. If input torque Tin is larger than input torque threshold value Tinkyoka (No), the routine goes to a step S10. At step S10, automatic transmission controller 15 inhibits the shift revolution synchronization control. At the next step S11, automatic transmission controller 15 carries out the ordinary shift control as described above and as shown in FIGS. 6A through 6F. Then, the present control is ended.

On the other hand, if input torque Tin is equal to or smaller than input torque threshold value Tinkyoka (Yes), the routine goes to a step S5. At step S5, automatic transmission controller 15 reads the accelerator opening angle of accelerator pedal 3 by a plurality of numbers of times and calculates accelerator depression speed dTH (time variation in the accelerator opening angle). Then, at step S5, automatic transmission controller 15 determines whether the calculated accelerator depression speed dTH is equal to or larger than threshold value dTHkyoka of the depression speed of automatic transmission 2. If dTH≧dTHkyoka, an accelerator depression speed determination flag is set to ON. At the next step S6, automatic transmission controller 15 determines whether accelerator depression speed determination flag during the shift start is set to ON. If the accelerator depression speed determination flag is not set to ON (No), the routine goes to step S10. At step S10, the shift revolution synchronization control is inhibited. At the next step S11, the ordinary shift control described above is executed and the present control is ended.

On the other hand, if accelerator depression speed determination flag is turned to ON (Yes), the routine goes to step S7.

At the next step S7, automatic transmission controller 15 reads the AT oil temperature during the shift start from At oil temperature sensor 18 and determines whether the AT oil temperature is equal to or higher than threshold value ATFkyoka. If the AT oil temperature is lower than threshold value ATFkyoka (No), the routine goes to step S10. At step S10, automatic transmission controller 15 allows the shift revolution synchronization control. At the next step S11, the ordinary shift control as described above and as shown in FIGS. 6A through 6F is executed and the present control is ended. It is noted that threshold value of ATFkyoka is, as described above, 20° C.

On the other hand, if, at step S7, AT oil temperature is equal to or higher than threshold value ATFkyoka (Yes), the routine goes to a step S8. At the next step S9, the shift revolution synchronization control as described above and as shown in FIGS. 3A through 3F is carried out and the present control is ended.

According to the above-described embodiment, it is a prerequisite that the shift revolution synchronization control as shown in FIGS. 3A through 3F is carried out in such a way that automatic transmission controller 15 determines drive duties of working liquid pressure duty solenoids 12, 13, and 14 provided in control valve 11 for the shift control purpose during the shift, sets the release side hydraulic related to the presently selected shift stage instantaneously to approximately 0%, and causes the engagement side hydraulic related to the next selection scheduled shift stage to reach to 100% in synchronization with engine speed Ne. In a case where the shift occurs under the driving condition that there is a possibility of the occurrence of the shift shock, the ordinary shift control is carried out in such a way that the shift control section (shift control means) gradually sets the release side hydraulic related to the shift stage under the present selection to approximately 0% and, at the same time, gradually sets the engagement side hydraulic related to the next selection scheduled stage to approximately 100% without execution of the shift revolution synchronization control. Thus, it becomes possible to determine and carry out each of such an ordinary shift control that the shift shock does not occur and the quick shift control, appropriately. Both of the prevention of the shift shock and the quick shift change are made compatible. Hence, both of the acceleration performance and the fuel consumption cannot not only improved but also the vehicular ride comfort performance can be improved.

In addition, the driving state in which the shift shock occurs, in this embodiment, is determined on the basis of the input torque inputted from engine 1 to automatic transmission 2, the operation (depression) speed of accelerator pedal 3 (or accelerator), and the liquid temperature (AT oil temperature) of the working liquid operated for the friction elements. Hence, the accurate determination of the driving state can be made and the acceleration performance and vehicular ride comfort performance can be improved.

In addition, when, in order to more accurately determine the driving state in which there is a possibility of the occurrence of the shift shock occurs, the driving state corresponds to at least one of the cases where the input torque inputted from engine 1 to automatic transmission 2 is relatively large, where accelerator pedal 3 is manipulated (depressed) at a manipulation (operation, viz., depression) speed slower than the predetermined threshold value of the operation speed, and where the liquid temperature (AT oil temperature) of the working liquid for operating the friction elements is lower than the predetermined threshold value of the AT oil temperature, automatic transmission controller 15 determines the driving state in which there is a possibility of the occurrence of the shift shock. Thus, the acceleration performance and vehicular ride comfort performance which are the main objects of the present invention can more specifically be improved.

It is noted that, in this embodiment, automatic transmission controller 15 carries out the shift operation to make the down-shift by depressing accelerator pedal 3 by the driver demanding a torque augment. However, the present invention is not limited to this down-shift. That is to say, for example, even in a case where the driver carries out a return (release) operation of accelerator pedal 3 so that automatic transmission controller 15 carries out the shift operation to make an up-shift, either the shift revolution synchronization control or the ordinary shift control is selectively carried out. Thus, the improvements in the acceleration performance and the vehicular ride comfort which are the main objects of the present invention can be achieved. It is of course that each of the first, second, third, and fourth embodiments is applicable to the power train shown in FIG. 1. It is noted that, in FIGS. 3B, 4B, 5B, 6B, 8B, 12B, 13B, 3-rd speed means the third-speed shift range and 2-nd speed means the second speed shift range.

The entire contents of a Japanese Patent Application No. 2004-238761 (filed in Japan on Aug. 18, 2004) are herein incorporated by reference. The scope of the invention is defined with reference to the following claims.

What is claimed is:

1. A shift control apparatus, comprising:
an automatic transmission in which an engine speed is inputted; and
a shift control section configured to perform a shift change in a shift stage of the automatic transmission to make a gear shift, configured to execute a shift revolution synchronization control in such a manner as to instantaneously release a shift purpose friction element which performs a power transmission through a presently selected shift stage and as to engage another shift purpose friction element which performs the power transmission through a next selection scheduled shift stage in synchronization with the engine speed, and configured to, in a case where the gear shift is made under a driving state in which there is a possibility of an occurrence of a shift shock, gradually release an engagement section which performs the power transmission through the presently selected shift stage and gradually engage another engagement section which enables the power transmission through the next selection scheduled shift stage without an execution of the shift revolution synchronization control.

2. A shift control apparatus as claimed in claim 1, wherein the driving state in which there is a possibility of the occurrence of the shift shock is determined on the basis of an input torque inputted from the engine to the automatic transmission.

3. A shift control apparatus as claimed in claim 1, wherein the driving state in which there is a possibility of the occurrence of the shift shock is determined on the basis of an operational speed of an accelerator which magnifies the engine speed in accordance with a manipulated variable of the accelerator.

4. A shift control apparatus as claimed in claim 1, wherein the driving state in which there is a possibility of the occurrence of the shift shock is determined on the basis of a liquid temperature of a working liquid by which a working pressure required for the shift purpose friction elements to be released and engaged.

5. A shift control apparatus as claimed in claim 4, wherein the driving state in which there is a possibility of the occurrence of the shift shock corresponds to one of cases where an input torque inputted from an engine to the automatic transmission is larger than a predetermined threshold value of the input torque, where an accelerator to increase the engine speed in accordance with a manipulated variable thereof is manipulated at a speed lower than a predetermined threshold value of a manipulation speed, and where a liquid temperature of the working liquid by which the working pressure required for the shift purpose friction elements to be released and engaged is lower than a predetermined threshold value of the working liquid temperature.

6. A shift control apparatus as claimed in claim 1, wherein the shift control apparatus further comprises a determining section configured to determine whether an input torque of the automatic transmission during a shift start is larger than a predetermined threshold value of the input torque and wherein the shift control section is configured to execute the shift revolution synchronization control when the determining section determines that the input torque is equal to or smaller than the predetermined threshold value of the input torque and to release the engagement section which performs the power transmission through the presently selected shift stage and to gradually engage the other engagement section which enables the power transmission under the next selection scheduled shift stage when the determining section determines that the input torque is larger than the predetermined threshold value of the input torque.

7. A shift control apparatus as claimed in claim 1, wherein the shift control apparatus further comprises a determining section configured to determine whether a depression speed of an accelerator pedal is slower than a predetermined threshold value of the depression speed of the accelerator pedal and wherein the shift control section is configured to execute the shift revolution synchronization control when the determining section determines that the depression speed of the accelerator pedal is equal to or faster than the predetermined threshold value of the depression speed of the accelerator pedal and to gradually release the engagement section which transmits the power through the presently selected shift stage and to gradually engage the other engagement section which enables the power transmission through the next scheduled shift stage when the determining section determines that the depression speed is slower than the predetermined threshold value of the depression speed of the accelerator pedal.

8. A shift control apparatus as claimed in claim 1, wherein the shift control apparatus further comprises a determining section configured to determine whether an AT oil temperature during a shift start is lower than a threshold value of the AT oil temperature and wherein the shift control section is configured to execute the shift revolution synchronization control when the determining section determines that the AT oil temperature is equal to or higher than the predetermined threshold value of the AT oil temperature and to gradually release the engagement section which performs the power transmission through the presently selected shift stage and to gradually engage the other engagement section which enables the power transmission through the next scheduled shift stage when the determining section determines that the AT oil temperature is lower than the predetermined threshold value of the AT oil temperature.

9. A shift control apparatus as claimed in claim 1, wherein the shift control section comprises: a downshift command determining section configured to determine whether a downshift command is issued; an input torque threshold value calculating section configured to calculate an input torque of the automatic transmission and an input torque threshold value thereof on the basis of a torque ratio, an engine torque, a shift kind, and a vehicle speed when the downshift command is issued; a first determining section configured to determine whether the input torque is equal to or smaller than the input torque threshold value; a second determining section configured to determine whether a depression speed of an accelerator pedal is equal to or higher than a predetermined threshold value of the depression speed of the accelerator pedal when the first determining section determines that the input torque of the automatic transmission is equal to or smaller than the input torque threshold value; a third determining section configured to determine whether an AT oil temperature during a start of the gear shift is equal to or higher than a predetermined threshold value of the AT oil temperature when the second determining section determines that the depression speed of the accelerator pedal is equal to or higher than the predetermined threshold value of the depression speed; and an allowance section that allows an execution of the shift revolution synchronization control when the third determining section determines that the AT oil temperature is equal to or higher than the predetermined threshold value of the AT oil temperature.

10. A shift control apparatus as claimed in claim 9, wherein the shift control section comprises a first execution section configured to execute the shift revolution synchronization control when the allowance section allows the execution of the shift revolution synchronization control.

11. A shift control apparatus as claimed in claim 9, wherein the shift control section further comprises: an inhibiting section configured to inhibit an execution of the shift revolution synchronization control, when the first determining section determines that the input torque of the automatic transmission is larger than the predetermined threshold value of the input torque; and a second execution section configured to execute an ordinary shift control in such a manner that the engagement section which transmits the power under the presently selected shift stage is gradually released and the other engagement section which enables the power transmission under the next selection scheduled shift stage is gradually engaged, when the inhibiting section inhibits the execution of the shift revolution synchronization control.

12. A shift control apparatus as claimed in claim 9, wherein the shift control section further comprises: an inhibiting section configured to inhibit an execution of the shift revolution synchronization control, when the second determining section determines that the depression speed of the accelerator pedal is slower than the predetermined threshold value of the depression speed of the accelerator pedal; and a second execution section configured to execute an ordinary shift control in such a manner that the engagement section which transmits the power under the presently selected shift stage is gradually released and the other engagement section which enables the power transmission under the next selection scheduled shift stage is gradually engaged, when the inhibiting section inhibits the execution of the shift revolution synchronization control.

13. A shift control apparatus as claimed in claim 9, wherein the shift control section further comprises: an inhibiting section configured to inhibit an execution of the shift revolution synchronization control, when the third determining section determines that the AT oil temperature of the automatic transmission is lower than the predetermined threshold value of the AT oil temperature; and a second execution section configured to execute an ordinary shift control in such a manner that the engagement section which performs the power transmission through the presently selected shift stage is gradually released and the other engagement section which enables the power transmission through the next selection scheduled shift stage is gradually engaged, when the inhibiting section inhibits the execution of the shift revolution synchronization control.

14. A shift control method applicable to an automatic transmission in which an engine speed is inputted, the shift control method comprising:
performing a shift change in a shift stage of the automatic transmission to make a gear shift;
executing a shift revolution synchronization control in such a manner as to instantaneously release a shift purpose friction element which performs a power transmission through a presently selected shift stage and as to engage another shift purpose friction element which performs the power transmission through a next selection scheduled shift stage in synchronization with the engine speed; and,
in a case where the gear shift is made under a driving state in which there is a possibility of an occurrence of a shift shock, gradually releasing an engagement section which performs the power transmission through the presently selected shift stage and gradually engaging another engagement section which enables the power transmission through the next selection scheduled shift stage without an execution of the shift revolution synchronization control.

15. A shift control apparatus, comprising:
an automatic transmission in which an engine speed is inputted; and
shift control means for performing a shift change in a shift stage of the automatic transmission to make a gear shift, the shift control means executing a shift revolution synchronization control in such a manner as to instantaneously release a shift purpose friction element which performs a power transmission through a presently selected shift stage and as to engage another shift purpose friction element which performs the power transmission through a next selection scheduled shift stage in synchronization with the engine speed, and, in a case where the gear shift is made under a driving state in which there is a possibility of an occurrence of a shift shock, gradually releasing an engagement section which performs the power transmission through the presently selected shift stage and gradually engaging another engagement section which enables the power transmission through the next selection scheduled shift stage without an execution of the shift revolution synchronization control.

* * * * *